(12) United States Patent
Salazar Altamar et al.

(10) Patent No.: US 9,675,522 B2
(45) Date of Patent: Jun. 13, 2017

(54) ELECTRONIC DOSAGE DISPENSING SYSTEM FOR FILLING SOFTGEL CAPSULES

(71) Applicants: Carlos Salazar Altamar, Barranquilla (CO); Leopoldo Pardo, Barranquilla (CO); Ivan Romero, Barranquilla (CO); Gustavo Anaya, Barranquilla (CO)

(72) Inventors: Carlos Salazar Altamar, Barranquilla (CO); Leopoldo Pardo, Barranquilla (CO); Ivan Romero, Barranquilla (CO); Gustavo Anaya, Barranquilla (CO)

(73) Assignee: PROCAPS SA, Barranquilla (CO)

(*) Notice: Subject to any disclaimer, the term of this patent is extended or adjusted under 35 U.S.C. 154(b) by 715 days.

(21) Appl. No.: 13/903,975

(22) Filed: May 28, 2013

(65) Prior Publication Data

US 2014/0353881 A1 Dec. 4, 2014

(51) Int. Cl.
*B29C 47/00* (2006.01)
*A61J 3/07* (2006.01)

(52) U.S. Cl.
CPC .............. *A61J 3/074* (2013.01); *B29C 47/00* (2013.01)

(58) Field of Classification Search
CPC ................................ A61J 3/074; B29C 47/00
See application file for complete search history.

(56) References Cited

U.S. PATENT DOCUMENTS 5,967,126 A * 10/1999 Ofner ................ F02M 21/0212
123/525

* cited by examiner

*Primary Examiner* — Robert J Grun
(74) *Attorney, Agent, or Firm* — Isaac Angres (57) ABSTRACT

The invention relates to a rotary die device for producing soft capsules, comprising a capsule forming unit for forming a soft-capsule shell and a novel dosing unit for feeding a filling material into the capsule forming unit, characterized in that the dosing unit comprises a dispensing system that includes (a) a container defining a reservoir for storing therapeutic or non-therapeutic compositions; (b) a low pressure pump; (c) a high pressure peristaltic pump; (d) a supply line for the therapeutic or non-therapeutic compositions; and (d) one or more electromagnetically activated nozzles/injectors to fill the softgel capsules with the therapeutic or non-therapeutic compositions.

2 Claims, 7 Drawing Sheets

ELECTRONIC DOSAGE DISPENSING SYSTEM FOR FILLING SOFTGEL CAPSULES

This application claims the priority benefit under 35 U.S.C. section 119 of U.S. Provisional Patent Application No. 61/651,587 entitled "Electronic Dosage Dispensing System For Filling Softgel Capsules" filed on May 25, 2012; which is in its entirety herein incorporated by reference.

FIELD OF THE INVENTION

The invention relates to a method for producing softgel capsules according to the rotary die method with a improved filling system. The invention also relates to a system for filling softgel capsules containing a pharmacologically or physiologically active substance.

This invention further relates to a dispensing and filling system for delivering a metered dose of medicinal product from a supply tank to a softgel capsule.

This invention further relates to a dispensing system for filling softgel capsules that uses electromagnetic activation.

The invention also relates to a fluid dose-measuring device adapted to be releasably received in a dispensing apparatus having an electromagnetic coil.

BACKGROUND OF THE INVENTION

Softgel capsules are nowadays usually produced by the rotary die method, which was described for the first time in U.S. Pat. No. 2,288,327. In this method, two bands of film, for example of aqueous gelatin solution, are guided over counter-rotating forming rolls and fused to each other. On their surface, these forming rolls have recesses (cavities), which are encircled by flanges. The two bands are suitably heated to below the melting point and fused to each other under the force of the flanges. At the same time, shaped articles in the form of soft capsules are severed from the bands by being pinched off. During the fusing of the bands, the capsules thereby forming are dosed with filling material through fine channels in the filling wedge.

The dosing of the filling material is performed with the aid of precision dosing pumps (piston-type dosing pumps), which are in the same generic category as reciprocating displacement machines. The metered volume of fluid is thereby brought up to the capsule halves on both sides through the filling wedge in a number of pulses, depending on the size of the volume by way of individual lines for each capsule of 30 to 70 cm in length. In this case, both the principle of half-dosing into each of the two capsule halves (Y-shaped duct) and single-channel conductance (I-shaped duct) up to the tip of the filling wedge (buttonhole segment) are customary. The capsules created are in this case made to bulge to the extent to which a pumping surge forces filling material into the capsule cups. Although the principle was described as long ago as 1935, the design of the pumps and of the filling wedge has remained substantially unchanged to the present day and is still in use.

Figure 1:
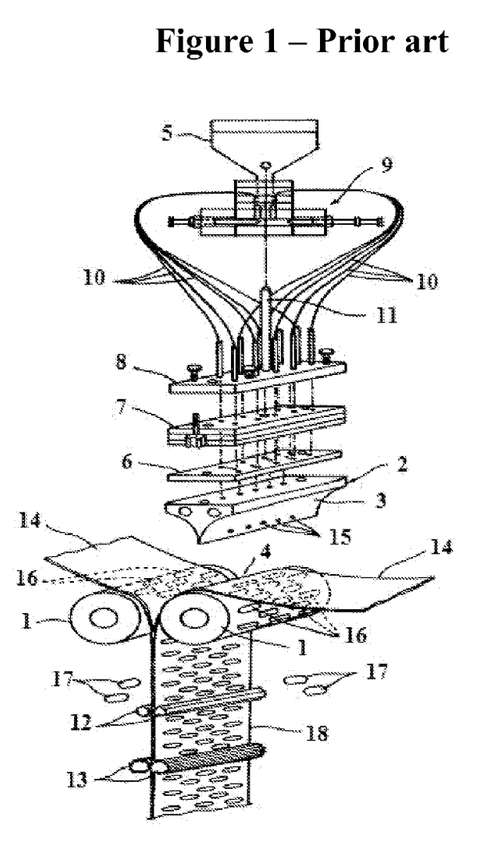
FIGS. 1, 2 and 3a and 3b are intended to show prior art rotary apparatus for making capsules including parts related to the filling of the capsules.
Figure 2:
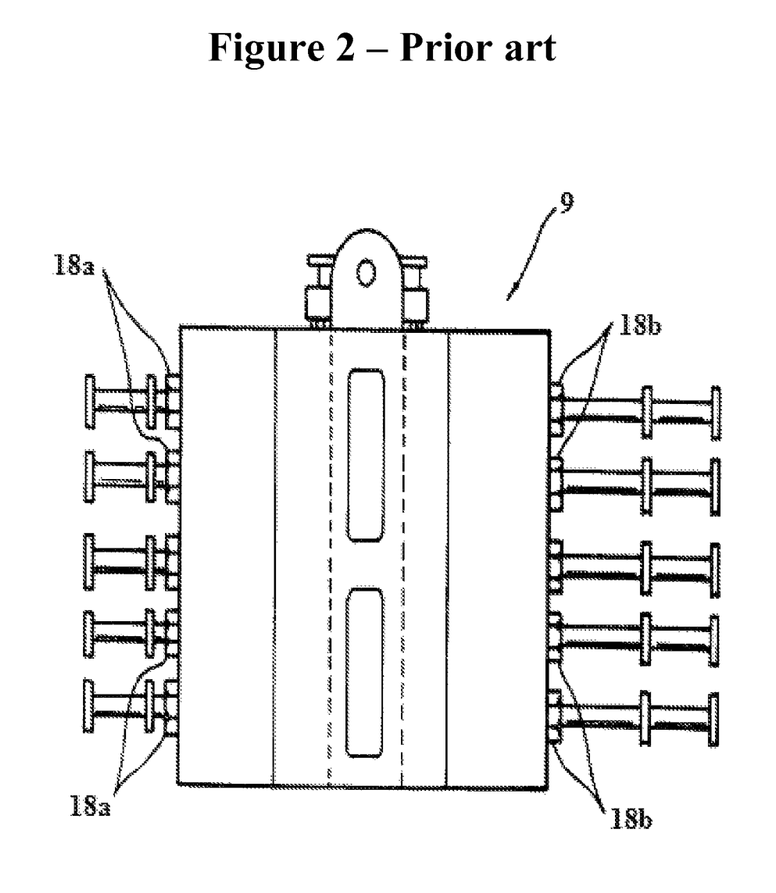
Figure 3A:
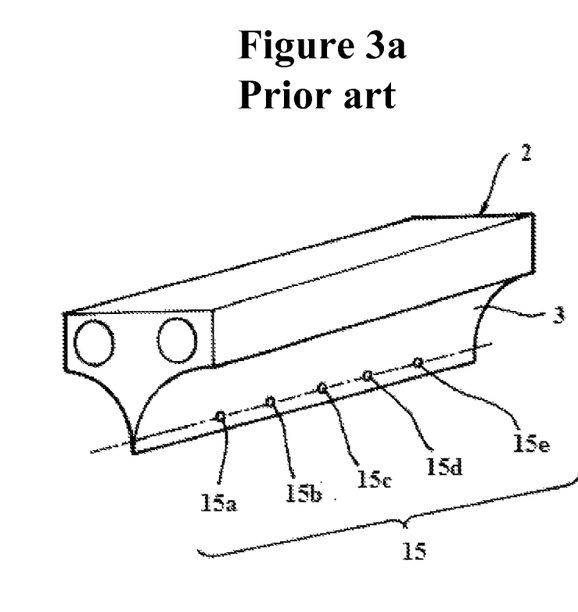
Figure 3B:
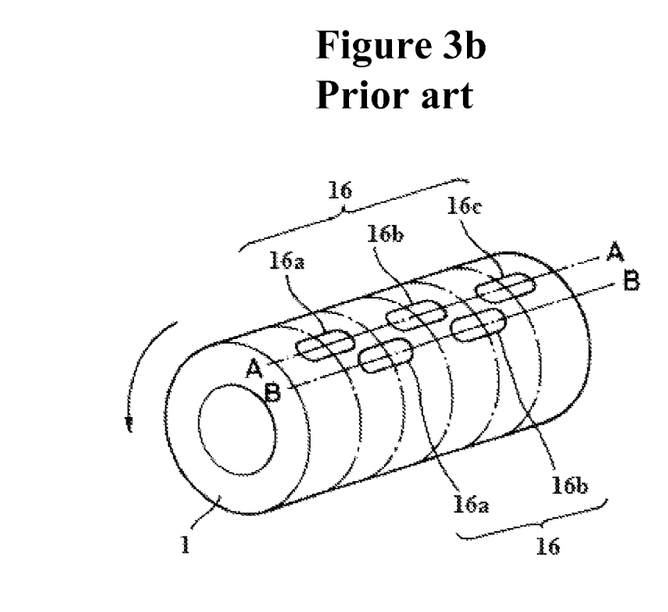

Soft gel capsules are generally made by a using an apparatus as illustrated in FIGS. 1-3.

The manufacturing apparatus shown in FIG. 1 includes a pair of die rolls 1, 1 that are close to and confront each other, a nozzle segment 2 that supplies a filling material and is formed of an inverse mountain-like projection 3 having curved faces that are positioned in confronting relation with each other at right and left sides about the lower end central portion thereof, wherein the projection 3 confront and is engaged in a curved recess 4 that is formed by surrounding curved peripheral surfaces of the die rolls 1, 1 at the upper sides thereof, and a supply hopper 5 located at the uppermost end thereof.

There are a distributor (dispersion plate) 6 for distributing the filling material, a slide valve mechanism 7 for controlling the supply of the filling material by sliding operation, a tube assembly plate 8 on which pipes for connection with a plurality of tubes are provided upright, and a plunger type pump 9 (hereinafter referred to simply as a pump 9) having a plurality of cylinders, that are respectively interposed between the nozzle segment 2 and the supply hopper 5 in the ascending order, and wherein the plurality of tubes (hoses) 10 for supplying the filling material therethrough that are provided between the plurality of cylinders of the pump 9 and the tube assembly plate 8. Further, there are provided a return tube (hose) 11 that is interposed between the distributor 6, the slide valve mechanism 7 and the supply hopper 5, for returning the filling material that becomes useless, strip rolls 12, 12 for separating a pair of soft capsules that are provided under and appropriately away from the die rolls 1, 1, and a pair of mangle rolls 13, 13 which draws the pair of gelatin sheets.

When manufacturing the soft capsules, two gelatin sheets 14, 14 are supplied between the pair of rotating die rolls 1, 1 from the upper side thereof at the right and left sides thereof, and the filling material such as liquid medicine is filled in the supply hopper 5, wherein the filling material is supplied to a plurality of nozzle holes 15 that are arranged in one row in a longitudinal direction of the right and left curved faces of the inverse mountain-like projection 3 of the nozzle segment 2 at portions close to the lower end edge (or at the lowermost end edge) through the tubes 10, the tube assembly plate 8, the slide valve mechanism 7 and the distributor 6 when the pump 9 is actuated.

As a result, a plurality of capsule pockets 16 that are provided on the outer peripheral surfaces of the die rolls 1, 1 and arranged axially in a row occupy the nozzle holes 15 of the nozzle segment 2 while they are rotated, and hence the filling material is temporarily stored inside two gelatin sheets 14, 14, and they are conveyed downward with the rotation of the die rolls 1, 1. The gelatin sheets 14, 14 are brought into intimate contact with each other in a moment when the filling material passed through the narrowest part between the die rolls 1, 1, and they are cut and brought into intimate contact with each other under pressure at the same time when the annular blades that are formed at the peripheries of the capsule pockets 16 of the die rolls 1, 1 mesh with each other, so that intended soft capsules 17 are formed.

The thus formed soft capsules 17 that remain stuck to the capsule pockets 16 of the die rolls 1, 1 are stripped off by a brush or the like while the soft capsules 17 that remain stuck to a remaining gelatin sheet 18 formed by bonding two gelatin sheets 14, 14 are separated by the pair of strip rolls 12, 12, and also the remaining gelatin sheet 18 is drawn downward by the pair of mangle rolls 13, 13.

The soft capsules are instantaneously manufactured in practice, wherein the setting of the discharging accuracy of the filling material from the nozzle holes 15 of the nozzle segment 2 and of the timing such as rotation of the die rolls 1, 1 become very important. If the discharging accuracy and the timing such as rotation are poorly set, the amount of the filling material filled in the soft capsules 17 is varied or the gelatin sheets 14, 14 are poorly bonded to each other or there occurs the deformation of the shape of the soft capsules 17.

Accordingly, there has been generally employed a pump as the pump 9 shown in FIG. 2, wherein the pump includes a plurality of cylinders 18a, 18b (respectively five cylinders in this example) that are arranged symmetrically at right and left. Either of the cylinders 18a, 18b corresponds to each nozzle hole 15 of the nozzle segment 2 so as to secure the discharging accuracy, and a timing between the actuating or driving speed of the pump 9 and the rotational speed of the die rolls 1, 1 is accurately provided or set using a timing gear or the like.

For example, a filling state is explained with reference to a case using the pump or plunger 9 shown in FIG. 2, the typical nozzle segment 2 having five nozzle holes 15a to 15e as shown in FIGS. 3a and 3b, and a typical right die roll 1 (left die roll 1 is omitted having three capsule pockets 16a, 16b and 16c that are arranged along the row denoted by the line A-A and two capsule pockets 16a and 16b are arranged along the row denoted by the line B-B wherein these capsule pockets are repeatedly provided in the circumferential direction.

When the filling material is filled in the three capsule pockets 16a, 16b and 16c that are arranged in the row denoted by the line A-A, all the cylinders 18b provided at the right side of the pump 9 are actuated, while when the filling material is discharged, the nozzle holes 15a, 15c and 15e of the nozzle segment 2 corresponding to the capsule pockets 16a, 16b and 16c are used, whereas the filling material corresponding to the nozzle holes 15b and 15d is returned to the supply hopper 5 through the distributor 6, the slide valve mechanism 7 and the return tube 11.

Meanwhile, when the filling material is filled in the next two capsule pockets 16a and 16b that are arranged in the row denoted by the line B-B, all the cylinders 18b provided at the right side of the pump 9 are actuated, while when the filing material is discharged, the nozzle holes 15b and 15d of the nozzle segment 2 corresponding to the two capsule pockets 16a and 16b are used, whereas the filling material corresponding to the nozzle holes 15a, 15c and 15e are returned to the supply hopper 5 through the distributor 6, the slide valve mechanism 7 and the return tube 11. Such a filling operation is simultaneously operated at the left side of the die roll 1.

Such a discharging process is sequentially repeated by the rotation of the die rolls 1, 1 so as to form intended soft capsules 17. (Angres)

There is a long felt need in the art for filling softgel capsules more efficiently and more accurately.

SUMMARY OF THE INVENTION

The invention provides a dosage dispensing system for filling softgel capsules comprising: (a) a container defining a reservoir for storing therapeutic or non-therapeutic compositions; (b) a low pressure pump; (c) a high pressure pump; (d) a supply line for the therapeutic or non-therapeutic compositions; and (d) one or more nozzles/injectors to fill the softgel capsules with the therapeutic or non-therapeutic compositions.

The invention also provides fluid dose-measuring device adapted to be releasably received in a system for dispensing and having an electromagnetic coil which includes a housing with an outlet passage and a connector part defining an inlet passage, the housing forming an internal chamber which is in fluid communication with the inlet passage and the outlet passage, and the connector part being connectable to a fluid container; a piston moveably arranged in the chamber of the housing for reciprocating motion between a closed position in which a flow from the inlet passage to the outlet passage is prevented and an open position in which a flow from the inlet passage to the outlet passage is allowed, the piston comprising a ferromagnetic actuation part for electromagnetic actuation of the piston by the electromagnetic coil, where the actuation part is arranged in an outer body

DETAILED DESCRIPTION OF THE INVENTION

The invention provides fluid dose-measuring device adapted to be releasably received in a system for dispensing and having an electromagnetic coil which includes a housing with an outlet passage and a connector part defining an inlet passage, the housing forming an internal chamber which is in fluid communication with the inlet passage and the outlet passage, and the connector part being connectable to a fluid container; a piston moveably arranged in the chamber of the housing for reciprocating motion between a closed position in which a flow from the inlet passage to the outlet passage is prevented and an open position in which a flow from the inlet passage to the outlet passage is allowed, the piston comprising a ferromagnetic actuation part for electromagnetic actuation of the piston by the electromagnetic coil, where the actuation part is arranged in an outer body.

The system of the invention handles the amount of medicine dispensed into the segment which is sent through a nozzle/injector opening which is controlled by an electromagnetic coil. The amount dispensed depends on the pressure in the main supply of medicine and is controlled by a throttle valve in the low pressure line. FIG. 1 shows the overall system of the invention. The medicine dosage dispensing system is composed of three sub-systems:

1. Low pressure line: In the low-pressure line, medicine is pumped from the storage tank to the high pressure pump. One of the main features of this part of the process is that the pumping pressure at this stage does not affect the conditions of dosing medicine into the injectors, but it keeps filling the high pressure pump. In this low pressure line is located the storage tank, which is responsible for maintaining the drug under optimal conditions of temperature and hermeticity prior to its circulation by the metering/dosification system. Also, the function of the low pressure pump is to keep filling in the high pressure pump. This system can be seen schematically in FIG. 4.

Figure 4:
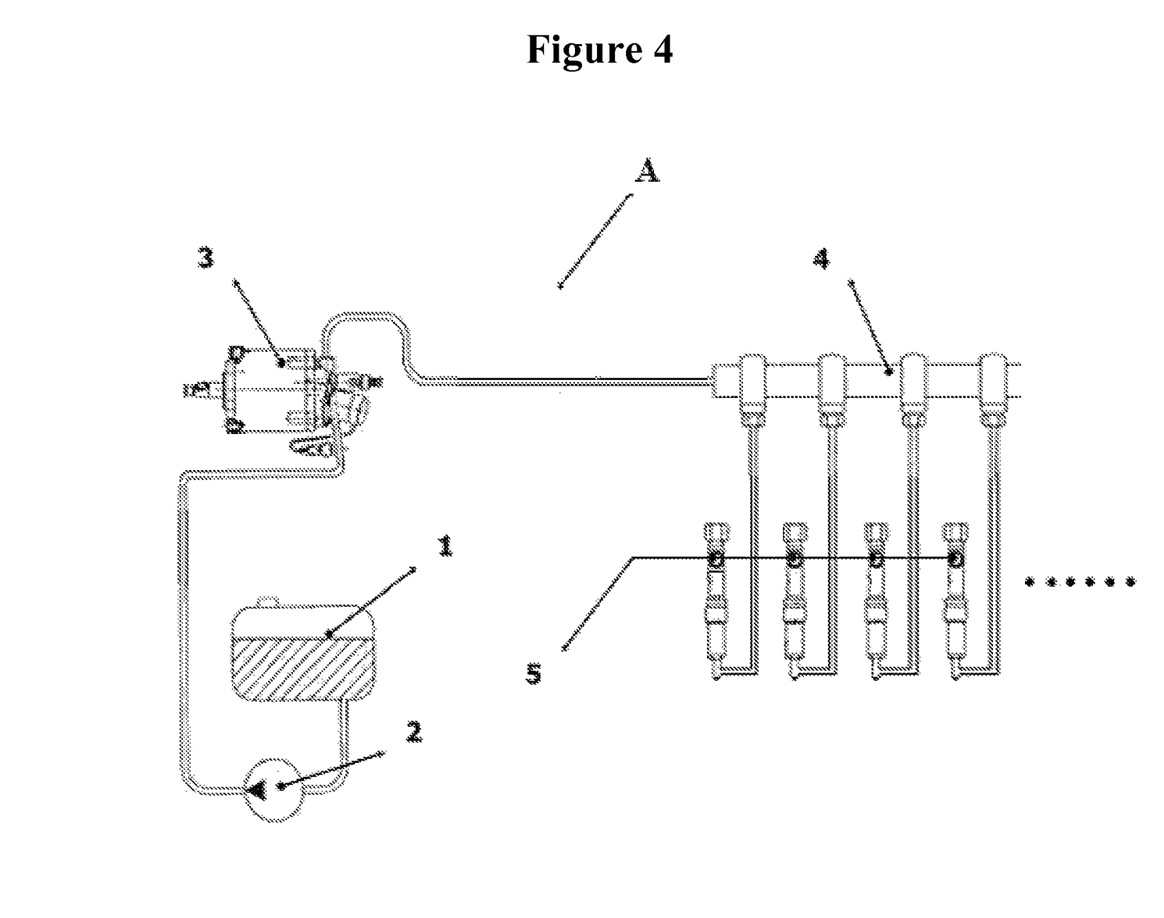
FIG. 4 is a schematic of the system of the invention.

Referring to FIG. 4, the system A of the invention includes a storage tank containing medicine 1, a low-pressure pump 2, a high pressure pump 3, supply lines for medicine 4, and the medicine injectors/nozzles 5.

2. The high pressure line consists of the high pressure injection pump 3 and the main feeding lines 4 to supply medicine to the injectors. The pressure in this line has a significant influence on the amount of medication dispensed to the segment. The high pressure pump pumps the medicine to the main supply line and the amount of pressure to be applied at this stage of the process is determined by regulating the valve associated with the high pressure pump. The main dispensing lines are responsible for distributing the medicine to each injector under the same amount of pressure conditions.

Medicine from the high pressure pump 3 is then fed to the input side of the injector, through perforated pipes in the injector body and then led to a needle at the bottom part which obstructs the outlet as it is pushed through a shaft by a spring. In this way the passage of the medicine to the segment is blocked. When the electromagnetic coil is energized, the upward force on the shaft overcomes the resistance of the spring, and thus opens the small access duct to the segment and medicine flows through the lower end towards the segment. The nozzle operates at low pressure toward the retainers, which facilitates a good seal and limits the possibility of drug leakage into the body of the injector. The injector is removable in the output from the first retainer and the body is made of stainless steel to facilitate cleaning between product changes. This system can be seen in FIG. 5.

Figure 5:
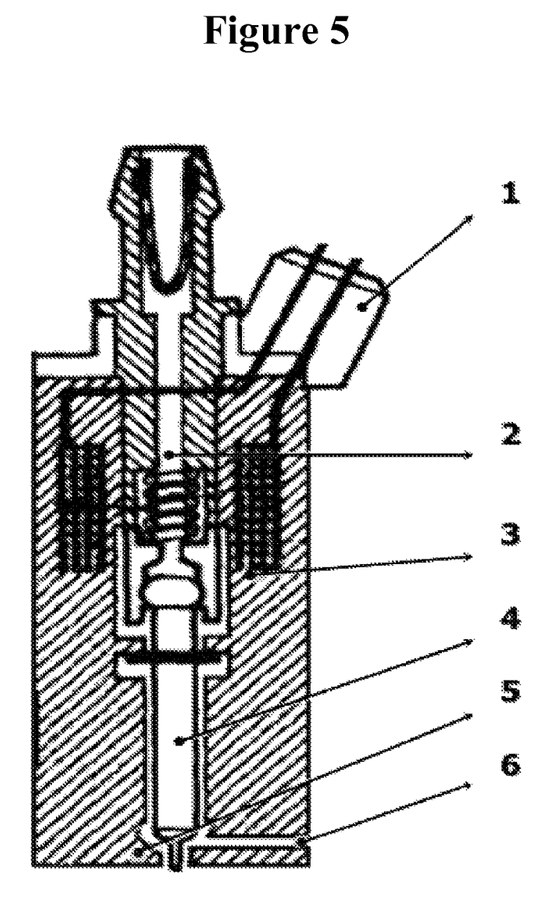
FIG. 5 shows an outline the the injector of the invention.

The injector of the invention as shown in FIG. 5 includes an electrical connector 1, a recoil spring 2 for the needle injector, an electromagnetic coil 3, a needle injector 4, a needle injector seat/base 5 and a medicine exit orifice 6 for dispensing and filling the softgel capsule.

The synchronization between the opening time of the injectors and the formation of the capsule is made via a reference signal taken from an inductive sensor which is located in the rotary molds and sends on pulses every time it starts the process of formation of the capsule. The injector opening time is influenced by the time available to dispense the medicine in the process of capsule formation and therefore depends on the speed of rotation of the machine, which is recorded by a speed sensor located in the encapsulating machine and refeeds the power signal to the electromagnetic coil of the injector. The dosage amount of medicine dispensed is controlled by the pressure which is verified by a pressure sensor, fed back to the computerized controls and regulated through the valve in the high pressure pump.

An important feature of the system is that the pumps are peristaltic pumps which ensures that there is no contact with the product, the main distributor of stainless steel with clamp type joints in the middle of the body for easy cleaning and are removable for easy cleaning and change of the tubing and pipes in the system. These features ensure that the device meets pharmaceutical requirements for easy cleaning.

Figure 6:
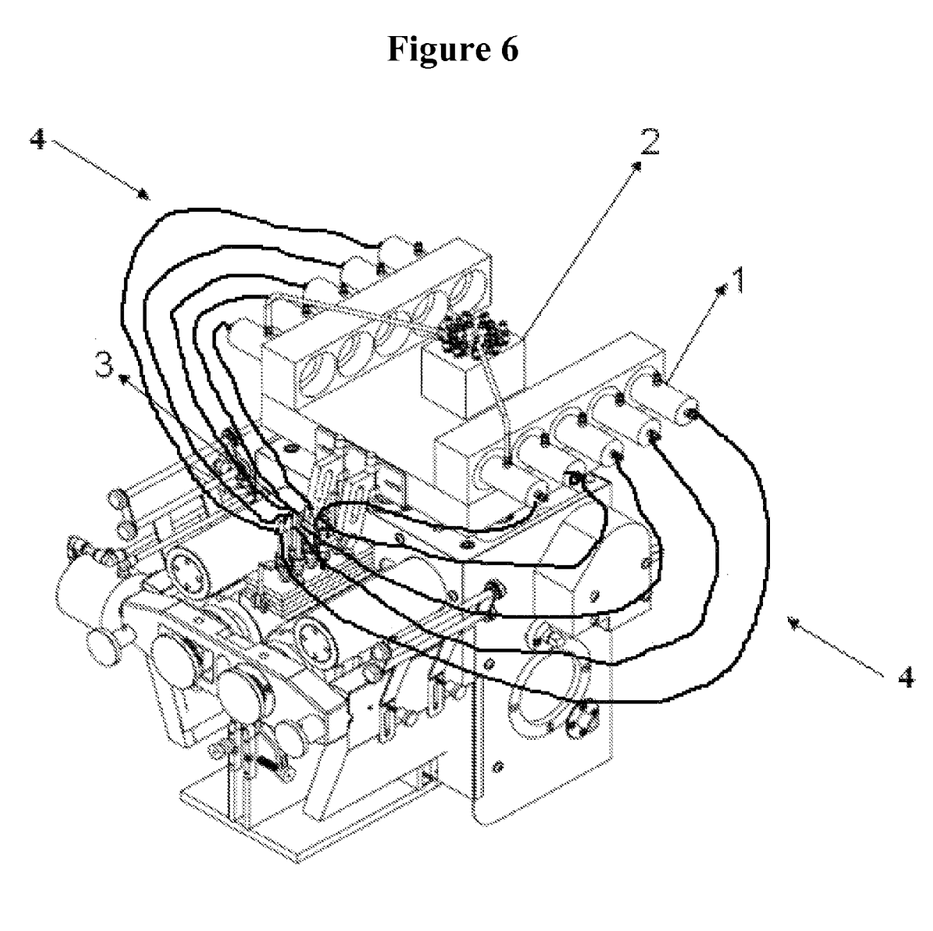
FIG. 6 shows the system of the invention incorporated into a rotary apparatus for making capsules.
Figure 7:
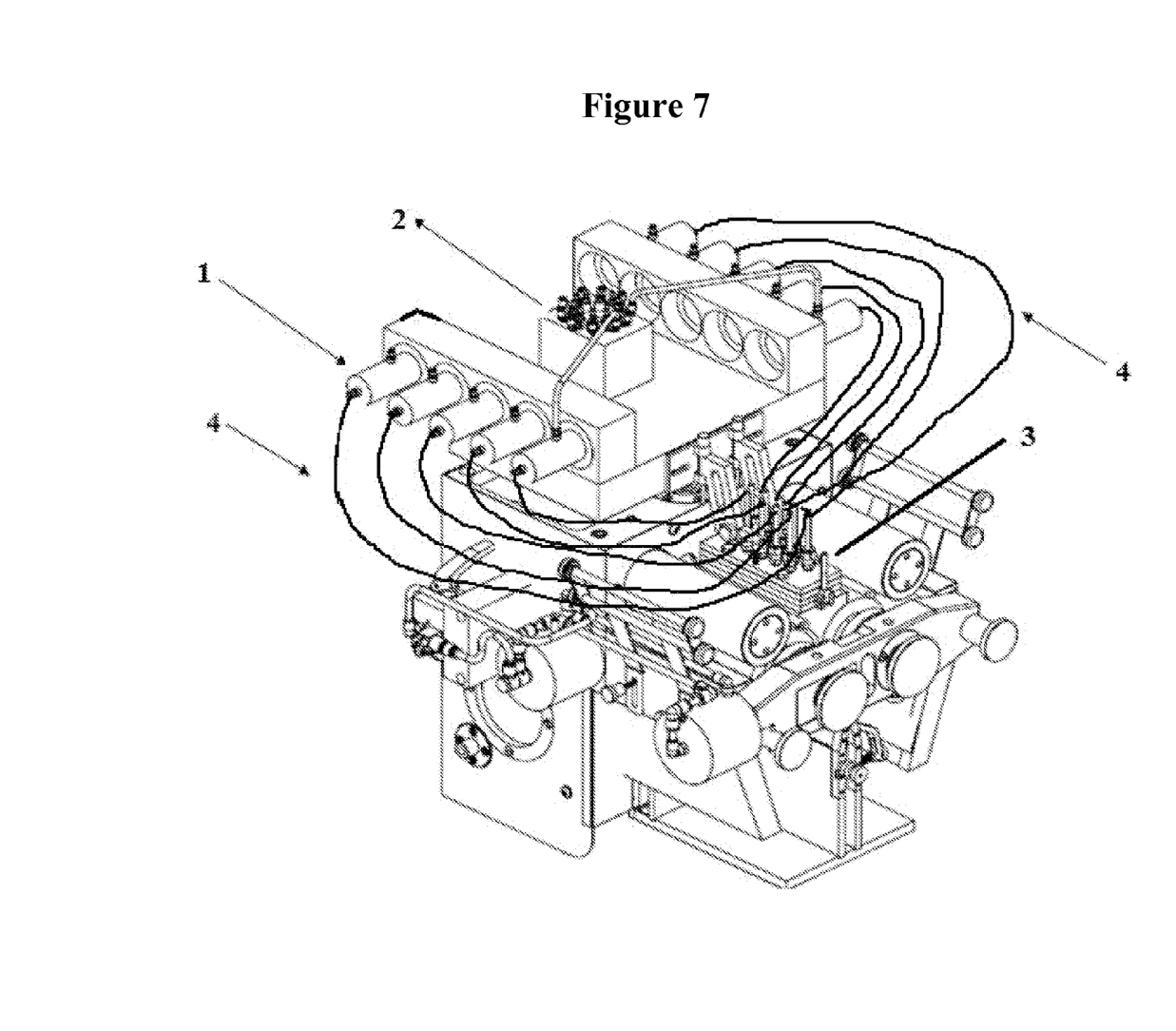
FIG. 7 is another perspective view of the apparatus of FIG. 6.

FIGS. 6 and 7 illustrate a rotary manufacturing apparatus that incorporates the system of the invention. In both Figures the injectors 1, are used to fill the softgel capsules via tubing 4, that is connected to the filling system of the segment.

The system of the invention provides the following advantages:

The dosing system improves the process of encapsulation in soft gelatin capsules in the following aspects:

Reduces the time between product changes that are required by only changing injector nozzles and piping Improved dosing accuracy by eliminating losses due to wear and variable volume of the chamber in the body of existing pumps.

Improves the standardization process by increasing the accuracy in the dosage dispensing method.

Reduces the susceptibility of human error by electronically controlling the adjustment of the dosage of the medicine.

Enables easy integration with process monitoring platforms through electronic control of the system.

Increased maintainability by reducing and simplifying the moving mechanical parts and devices involved in the process of dispensing the dosage of medicine.

The contents of all references cited in the instant specifications and all cited references in each of those references are incorporated in their entirety by reference herein as if those references were denoted in the text While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:

1. A dosage dispensing system for filling softgel capsules comprising:
   (a) a container defining a reservoir for storing therapeutic compositions;
   (b) a low pressure peristaltic pump;
   (c) a high pressure peristaltic pump;
   (d) a supply line for the therapeutic compositions; and
   (e) one or more electromagnetically activated nozzles/injectors to fill the softgel capsules with the therapeutic compositions.

2. A method for producing soft capsules on the rotary die principle, in which two continuously brought-together bands of film are formed into capsules between two counter-rotating forming rolls, a liquid filling material being introduced with the aid of a delivery means into the forming capsule cavity under pressure by way of a filling wedge, wherein the delivery means comprises the system of claim 1.

* * * * *